United States Patent [19]
Hackett

[11] 3,822,740
[45] July 9, 1974

[54] HEATING SYSTEM
[76] Inventor: Robert S. Hackett, 13 Fox Meadow Rd., Scarsdale, N.Y. 10583
[22] Filed: Mar. 6, 1972
[21] Appl. No.: 231,948

[52] U.S. Cl............... 165/45, 417/35, 417/292
[51] Int. Cl............................................ F28d 15/00
[58] Field of Search ............... 165/45; 417/35, 292

[56] References Cited
UNITED STATES PATENTS
2,167,878  8/1939  Crawford.............................. 165/45
2,218,051  10/1940  Robson et al........................ 417/35
2,672,820  3/1954  Hillier................................. 417/292

Primary Examiner—Charles Sukalo
Attorney, Agent, or Firm—Fitzpatrick, Cella, Harper & Scinto

[57] ABSTRACT

A wind driven heating system in which a windmill wheel is connected to drive a liquid pump which agitates a heat transfer liquid to heat it and to drive the heated liquid through a circuit to a radiator.

4 Claims, 1 Drawing Figure

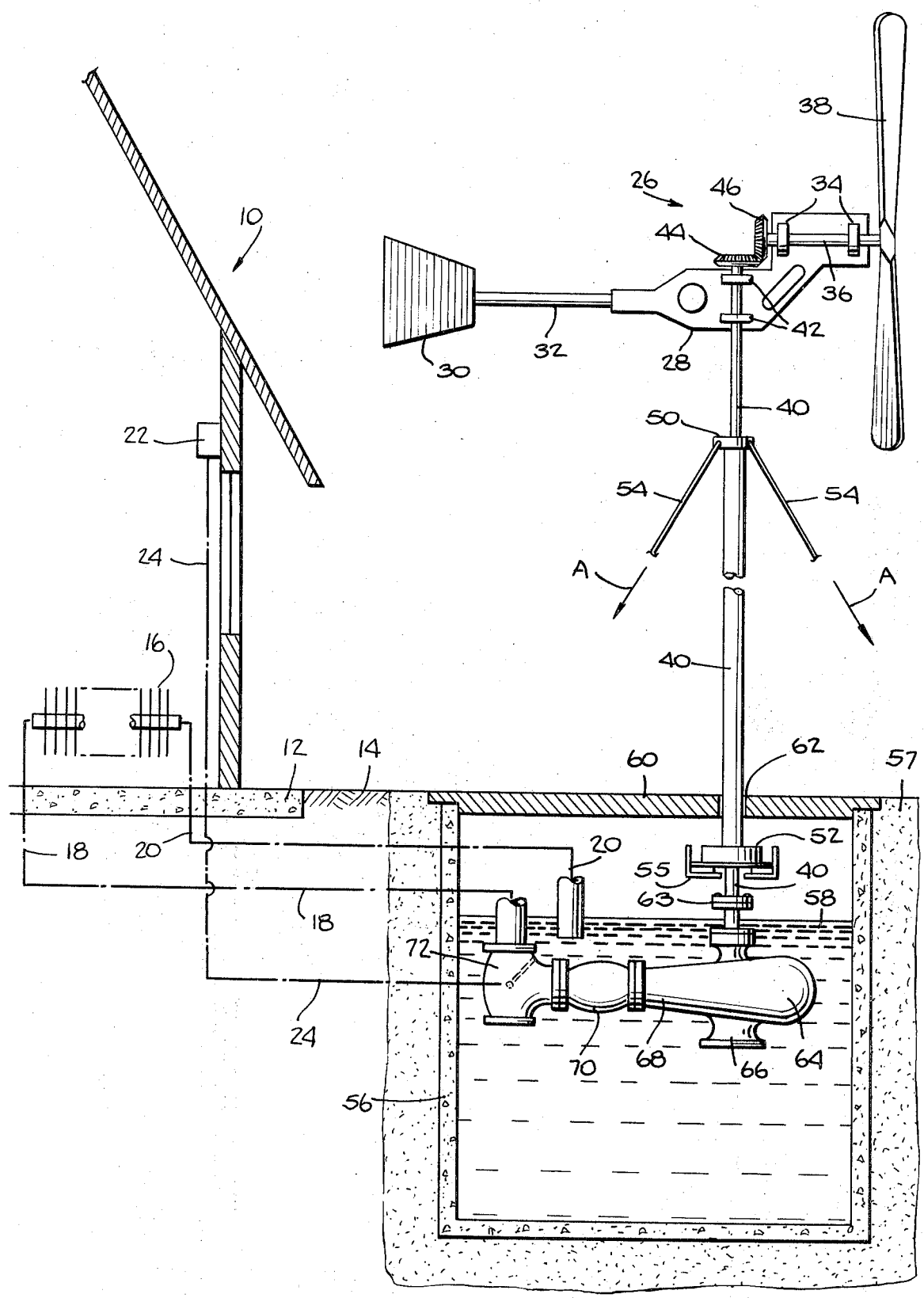

HEATING SYSTEM

This invention relates to heating systems and, more particularly it concerns novel arrangements for utilizing kinetic wind energy as a source of heat for buildings and the like.

Present heating systems for buildings depend almost exclusively on the burning of fossil fuel. While in most instances this source of heat is satisfactory, there are many other instances where a fossil fuel heating system is either insufficient or disadvantageous.

Fossil fuel, for example, is not readily available in many remote locations; and its transportation becomes quite expensive and burdensome. Additionally, the burning of fossil fuel tends to pollute the atmosphere.

The present invention serves to make available an alternate or an auxiliary source of energy, namely, wind, from which heat may be derived. This energy, in most cases, is readily available, is quite inexpensive and has no polluting effect on the atmosphere.

According to the present invention, the kinetic energy of wind is converted to mechanical energy in the form of shaft rotation; and this, in turn, is converted to heat in a liquid, such as water, by means of a pump which agitates the liquid and forces it through a restricted path. The heated liquid is then transferred to a radiator within the building or enclosure to be heated. Cooler liquid, which has lost its heat through the radiator to the interior of the building or enclosure, is returned to the heater pump for reheating. Wind energy is converted to mechanical shaft rotation, according to the present invention, by means of a vaned rotary element, such as a windmill mounted to face into the wind and to be turned by it. Temperature control of the enclosure is achieved by means of an adjustable thermostatically controlled bypass valve which directs more or less of the heated liquid to the radiator.

Temperature control of the heated liquid is easily achieved through the present invention by controlling the degree of restriction through which the liquid being pumped must flow. Automatic temperature regulation may be obtained, according to the present invention, by providing, as a restriction, a thermostatically controlled valve.

The present invention, in one aspect, serves to provide stored heat in the form of heated water or the like for later use. This is done by use of an insulated liquid storage tank into which some or all of the heated water from the pump is directed. This heated water may then be used when needed.

It will be appreciated that the heating obtained through the present invention can be utilized, either as the sole source of heat or as an auxiliary heat source, to supplement a fossil fuel heating system, depending upon the prevailing atmospheric conditions of air temperature and wind velocity and upon the availability of acceptable burnable fuels.

According to one feature of the present invention, various self-compensating effects can be achieved. For example, a power transmission balance is obtained due to the fact that wind power is proportional to the cube of wind velocity while the power required to turn the agitator or pump rotor in the liquid being heated is proportional to the cube of agitator or rotor rotational velocity.

A further self-compensating feature of the present invention is that those higher heat losses from a building which occur generally with increased wind velocities are offset by the enhanced heat input to the building derived from the same increased wind velocity.

According to another feature of the invention, the agitator or pump rotor may, in addition to producing heat in the heating liquid, also act to pump the liquid to a radiator or to a storage tank. Thus, the wind energy may be tapped both as a source of heat and as a source of pumping energy.

According to a still further feature of the invention, a novel windmill mounting tower is provided wherein the same element which provides the column support for the windmill also serves to transmit its rotational energy.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

A specific embodiment of the invention has been chosen for purposes of illustration and description, and is shown in the accompanying drawing, forming a part of the specification.

In the drawing, the sole FIGURE is a schematic representation of a wind driven building heating system in which the present invention is embodied.

As shown in this FIGURE, a building 10 is mounted on a foundation 12 at a ground surface 14. The building 10 may be provided with a conventional heating system (not shown) in the usual manner. In addition, or alternatively, the building 10 is provided with the novel heating system of the present invention. This novel heating system includes a radiator 16 mounted within the building. The radiator 16 is supplied with a heated fluid, such as water, via a radiator feed line 18. After this fluid gives up its heat through the radiator 16 to the interior of the building 10, it is exhausted via a radiator return line 20. There is also provided, inside the building 10, a room temperature control thermostat 22 which can be set to a desired temperature and which transmits signals along a control line 24 calling for more or less heated fluid to the radiator 16, according to whether the actual temperature in the building is lower or higher than that at which the thermostat 22 is set.

Outside the building 10, a wind engine 26 is mounted a substantial distance above the ground surface 14. This wind engine 26 includes a central frame 28, which may be formed of stiff stamped steel plate, and a flat, bladelike tailpiece 30, also of stamped steel plate. The tailpiece 30 is mounted, by means of an elongated tailpiece support 32, to extend rearwardly from the frame 28. At the end of the frame 28 opposite the tailpiece 30, there are secured a pair of blade shaft end thrust bearings 34 in which a horizontally extending blade shaft 36 turns. A blade element 38, such as a conventional airplane propeller, for example, is secured to the forward end of the blade shaft. The upper end of a vertically extending pump drive shaft 40 extends up through a pair of frame support thrust bearings 42; and a first bevel gear 44 on the upper end of the vertical pump drive shaft 40 meshes with a corresponding second bevel gear 46 on the rearward end of the horizontal blade shaft 36. The main body of the pump drive shaft 40 is supported by upper and lower main support thrust bearings 50 and 52. The upper main support thrust bearing 50 is located just below the frame 28 at a shoulder on the pump drive shaft 40. A set of guy wires 54 are secured to the upper thrust bearing 50 and exert a downward and outward pull on the bearing, as indicated by the arrows A in the drawing. These guy wires are anchored to the ground or to some fixed structure in the ground, in any known manner; and they are positioned in balanced array around the main pump drive shaft 40 to maintain it in vertical orientation in opposition to the thrust of the wind.

The lower main support thrust bearing 52 supports the entire weight of the main pump drive shaft 40 as well as the weight of the entire wind engine 26. In addition, the lower main support thrust bearing withstands the downward pull of the guy wires 54 acting through the upper bearing 50. As shown in the drawing, the lower bearing 52 is located at a shoulder on the shaft 40 inside a fluid reservoir 56 set into the ground. A support structure 55 is provided to support the lower thrust bearing 52.

The pump drive shaft 40, serves both as a torque transmission means and as a support column for the wind engine 26. Thus, no auxiliary structures are required other than the stabilizing guy wires. In this manner, a very large portion of the capital cost usually associated with windmill-type engines is eliminated.

The fluid reservoir 56, which is made of concrete backfilled with sand 57, or which may be fabricated of any other suitable material and similarly insulated, is set into the ground below the wind engine 26. The reservoir 56 contains a supply 58 of heating fluid such as water. A removable cover 60 is set on top of the reservoir; and the main body of the pump drive shaft 40 passes through an opening 62 in the cover.

The lower end of the pump drive shaft 40 extends down through the lower thrust bearing 52 where it is connected, via a coupling 63, to the vertical shaft of a centrifugal pump 64.

The centrifugal pump 64 is mounted below the surface of the heating fluid 58 in the reservoir. Liquid from the reservoir enters the pump via a pump inlet 66. The pump has an outlet 68 connected to a thermostatic butterfly valve 70. This valve is similar in construction to that used in an automobile engine cooling system. Thus, the valve 70 is closed to fluid flow when the temperature of the incident fluid is low. As the fluid temperature increases beyond a predetermined amount, the valve 70 opens to allow a flow therethrough of the fluid.

The outlet from the thermostatic butterfly valve 70 is connected to a thermostat actuated two-way discharge valve 72. This valve, which is connected to the thermostat 22 via the control line 24, directs liquid either back into the reservoir 56 or out through the radiator feed line 18 to the radiator 16.

The radiator return line 20, as shown, exhausts into the reservoir 56.

In operation of the above-described system, the building 10 will encounter heat losses which, at a given temperature, are greatest when the ambient wind velocities are highest. These high wind velocities, however, exert greater turning forces on the blade 38 of the wind engine 26. The tailpiece 30 serves to maintain the blade 38 pointing directly into the wind. In order to compensate for torque transmitted via the blade and pump shafts 36 and 40, the surface of the tailpiece 30 is curved or is disposed obliquely so that the blade 38 will be properly aimed.

As the blade 38 turns under the influence of the wind, it transmits rotational forces via the blade shaft 36, the bevel gears 46 and 44 and the pump drive shaft 40 to the pump 64 to drive the pump. As the pump 64 is driven, it aspirates liquid into its feed line 66 and forces the liquid out through its outlet line 68 and through the thermostatic butterfly valve 70. Because of the resistance offered by the valve 70, the pump blades will slip with respect to the fluid in the pump, and this slippage, in turn, builds up heat which raises the temperature of the fluid. This high temperature fluid causes the valve 70 to open so that the fluid passes into the discharge valve 72 from where it is directed either to the building radiator 16 or back to the reservoir 56.

Generally, when the system first begins operation, the temperature of the fluid is not high enough to be of much use in the radiator 16. Accordingly, the thermostatic butterfly valve 70 prevents fluid flow to the radiator. When the heating fluid has come up to proper temperature, the valve 70 opens to allow the heated fluid to flow to the two-way discharge valve 72. Depending upon the temperature inside the building 10 and the setting of the thermostat 24, the two-way discharge valve will direct more or less of the heated fluid to the radiator 16, while the remainder of the fluid is returned via the valve 72 to the reservoir 56. The fluid, which is directed to the radiator 16, gives up its heat there to warm the inside of the building 10 and, thereafter, passes back through the radiator return line 20 to the reservoir 56.

In the situation where the wind velocities are higher than necessary for the immediate heating requirements of the building 10, the excess energy may be converted to heat and stored in the reservoir 56. For this purpose, the two-way discharge valve 72 is set to direct the hot fluid from the thermostatic butterfly valve 70 downwardly into the reservoir 56. This will increase the temperature of the fluid in the reservoir; and the heat thus-stored can later be recovered by pumping the reservoir fluid through the radiator 16, either by means of the centrifugal pump 64 or by means of a separate pumping system (not shown), or by natural convection.

The combination of a wind machine and a liquid agitator mechanically interlocked as described above, serves to provide automatic load regulation whereby no governor is necessary to control speed. This is due to the fact that the wind power applied to the system is proportional to the cube of wind velocity, while the power required to turn the pump rotor or agitator varies as the cube of rotor speed. With this arrangement, moreover, a very efficient conversion of wind energy to radiator heat output is obtained, with the only losses being due to gear and bearing friction and minute heat losses from the reservoir, piping and pump shaft.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended hereto.

What is claimed is:

1. A heating system comprising means defining an enclosure, the outside of which is exposed to the atmosphere, a fluid reservoir, a fluid agitator in said reservoir, said agitator provided with an inlet communicating with the fluid in said reservoir and an outlet communicating with the inlet of said loop, a wind driven rotatable element connected to drive said agitator, a radiator through which a heating fluid from said reservoir passes, said radiator being located within said enclosure, a fluid conduit circuit interconnecting said radiator and said agitator in a closed loop and a valve positioned at the agitator outlet, said valve being operative in response to the temperature of the heating fluid thereat to prevent fluid flow out from said agitator for water temperature below a predetermined level whereby the fluid in said reservoir is heated by the fluid friction upon actuation of said agitator.

2. A heating system according to claim 1, wherein said agitator is a centrifugal pump.

3. A heating system according to claim 1, wherein said fluid conduit circuit includes means defining a restriction to fluid flow through said circuit.

4. A heating system according to claim 1, wherein said system includes a valve operable to divert fluid flow to bypass said radiator and a thermostat in said enclosure connected to adjust said valve.

* * * * *